(12) United States Patent  
Li et al.

(10) Patent No.: US 7,924,832 B2  
(45) Date of Patent: Apr. 12, 2011

(54) FACILITATING TRANSITION OF NETWORK OPERATIONS FROM IP VERSION 4 TO IP VERSION 6

(75) Inventors: Qing Li, Cupertino, CA (US); Yusheng Huang, San Jose, CA (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 146 days.

(21) Appl. No.: 12/270,043

(22) Filed: Nov. 13, 2008

(65) Prior Publication Data

US 2010/0118869 A1    May 13, 2010

(51) Int. Cl.  
*H04L 12/56* (2006.01)

(52) U.S. Cl. ........ 370/389; 370/390; 370/392; 370/401; 709/245

(58) Field of Classification Search ................. 370/392, 370/401, 466; 709/245  
See application file for complete search history.

(56) References Cited

U.S. PATENT DOCUMENTS

| | | | | |
|---|---|---|---|---|
| 6,038,233 A * | 3/2000 | Hamamoto et al. | .......... | 370/401 |
| 6,460,085 B1 | 10/2002 | Toporek et al. | ............... | 709/233 |
| 6,529,477 B1 | 3/2003 | Toporek et al. | ............... | 370/235 |
| 6,584,083 B1 | 6/2003 | Toporek et al. | ............... | 370/316 |
| 6,654,344 B1 | 11/2003 | Toporek et al. | ............... | 370/230 |
| 6,690,669 B1 * | 2/2004 | Tsuchiya et al. | ............... | 370/392 |
| 2003/0028671 A1 * | 2/2003 | Mehta et al. | ................. | 709/245 |
| 2004/0083306 A1 * | 4/2004 | Gloe | ............................. | 709/245 |
| 2005/0002406 A1 * | 1/2005 | Miyata et al. | ................. | 370/401 |
| 2006/0153230 A1 * | 7/2006 | Miyata et al. | ................. | 370/466 |

OTHER PUBLICATIONS

Nordmark, E., Basic Transition Mechanisms for Ipv6 Hosts and Routers, The Internet Society, Oct. 2005, pp. 1-23, Accessed Nov. 10, 2008.

* cited by examiner

*Primary Examiner* — Robert W Wilson  
*Assistant Examiner* — Mohamed Kamara  
(74) *Attorney, Agent, or Firm* — Baker Botts L.L.P.

(57) ABSTRACT

Methods, apparatuses and systems directed to facilitating transitions from IPv4 to IPv6 networks. In particular implementations, the invention facilitates or enables accessibility of network application services between IPv4 and IPv6 hosts, or traversal of network paths including both IPv6 or IPv4 domains. Particular implementations of the invention are directed to selective mapping of network layer addresses between IPv6 and IPv4 protocols and Domain Name System records under one or more policy controls. Other implementations of the invention are directed to a proxy-to-proxy based tunnel architecture allowing hosts implementing a first network layer protocol, such as IPv4, to traverse a network implementing a second network layer protocol, such as IPv6.

18 Claims, 8 Drawing Sheets

FACILITATING TRANSITION OF NETWORK OPERATIONS FROM IP VERSION 4 TO IP VERSION 6

TECHNICAL FIELD

The present disclosure generally relates to network layer protocols and, more particularly, to methods, apparatuses and systems facilitating transitions from a first network layer protocol to a second network layer protocol in a network communications environment.

BACKGROUND

A common problem facing organizations today is the shortage of Internet Protocol (IP) version 4 (IPv4) addresses. Network Address Translation (NAT) is often used to alleviate the address shortage problem; however, numerous business-critical applications that require end-to-end communications do not function over NAT. Internet Protocol version 6 (IPv6) is an network layer protocol for packet-switched internetworks. IPv4 is currently the dominant Internet Protocol version, and was the first to receive widespread use. The Internet Engineering Task Force (IETF) has designated IPv6 as its successor for general use on the Internet. IPv6 has a much larger address space than IPv4, which allows flexibility in allocating addresses and routing traffic. The extended address length eliminates the need to use network address translation to avoid address exhaustion, and also simplifies aspects of address assignment and renumbering when changing Internet connectivity providers.

An organization's decision to adopt IPv6 raises a number of transition issues. For example, the first set of criteria to be evaluated for decision making, is the availability of existing network or application services in IPv6 networks, and whether new IPv6 services are accessible to users with only IPv4 connectivity. Until IPv6 completely replaces IPv4, a number of so-called transition mechanisms are needed to enable IPv6-only hosts to reach IPv4 services and to allow isolated IPv6 hosts and networks to reach the IPv6 Internet over the IPv4 infrastructure. For example, Nordmark et al., RFC 4213, "Basic Transition Mechanisms for IPv6 Hosts and Routers," Network Working Group, Internet Engineering Task Force (October 2005), describe dual stack and tunneling mechanisms to facilitate transition from IPv4 to IPv6. Dual stack refers to the use of network stacks that support both IPv4 and IPv6. An example of tunneling is the encapsulation of IPv6 packets with IPv4 headers to allow packets to be forwarded between IPv6 networks over IPv4 networks.

SUMMARY

The present invention provides methods, apparatuses and systems directed to facilitating transitions from IPv4 to IPv6 networks. In particular implementations, the invention facilitates or enables accessibility of network application services between IPv4 and IPv6 hosts, or traversal of network paths including both IPv6 or IPv4 domains. Particular implementations of the invention are directed to selective mapping of network layer addresses between IPv6 and IPv4 protocols and Domain Name System records under one or more policy controls. Other implementations of the invention are directed to a proxy-based tunnel architecture allowing hosts implementing a first network layer protocol, such as IPv4, to traverse a network implementing a second network layer protocol, such as IPv6.

DESCRIPTION OF EXAMPLE EMBODIMENT(S)

A. Overview & Example Network Environment

Figure 1A:
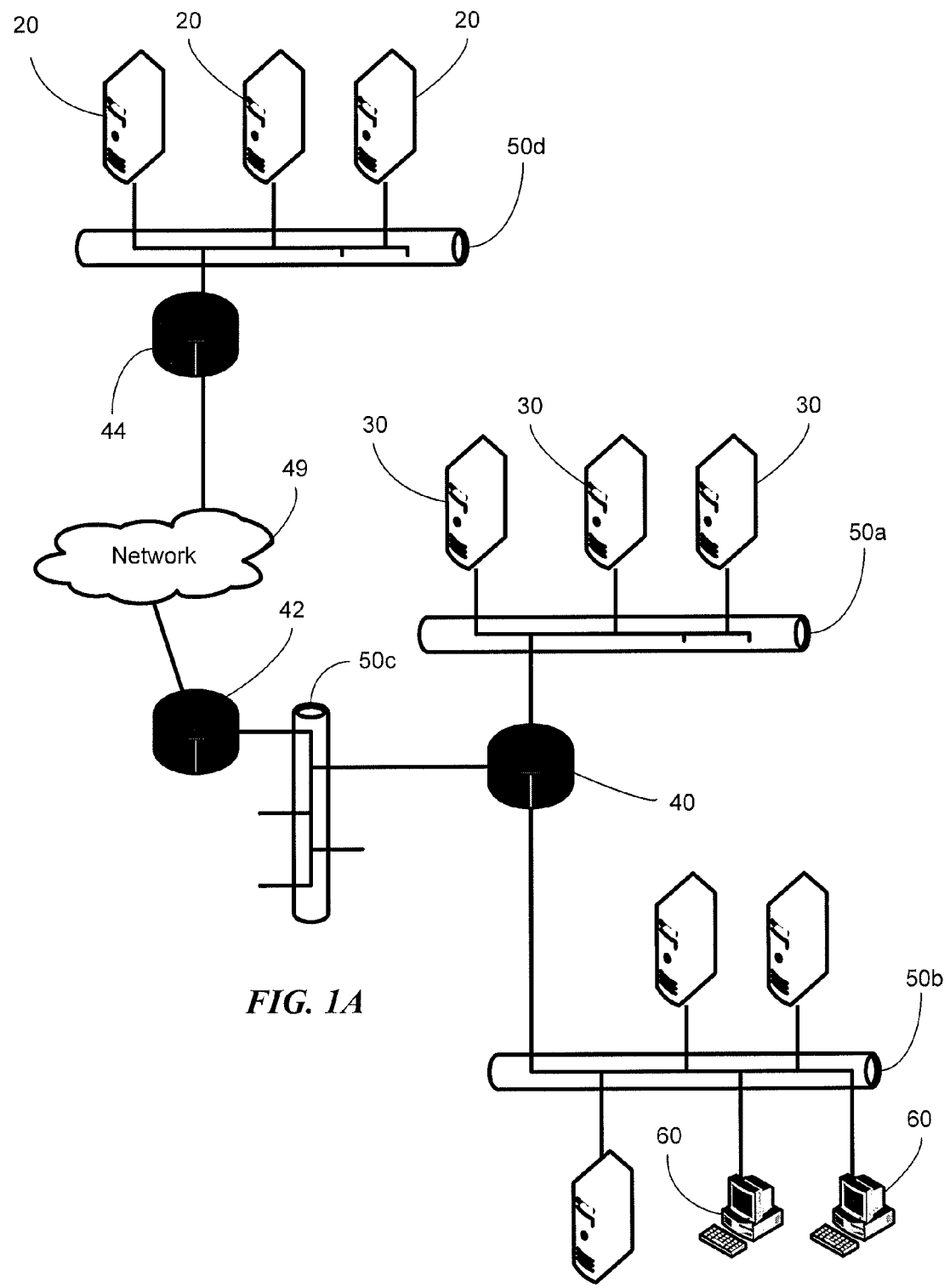
FIGS. 1A and 1B are schematic diagrams of computer network environments, in which particular embodiments of the present invention may operate.
Figure 1B:
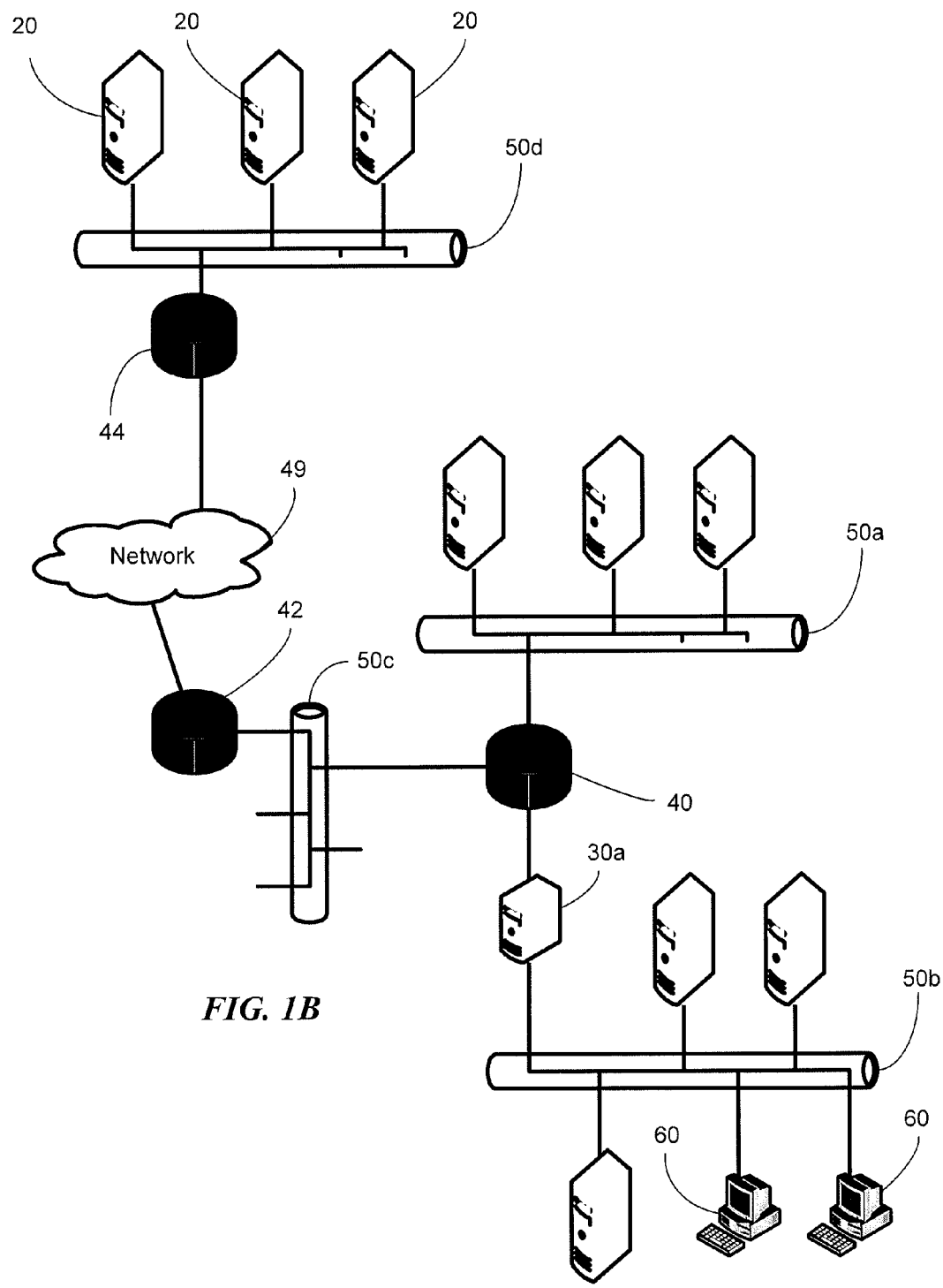

FIGS. 1A and 1B illustrate example computer network environments, in which particular embodiments of the present invention have application. As FIG. 1A shows, the computer network environment may comprise one or more servers 20, one or more proxies 30 and one or more clients 60. Routers 40, 42, 44 and networks 50a, 50b, 50c interconnect server(s) 20, proxy(ies) 30, client(s) 60 and other hosts operably connected to network 49. Networks 50a, 50b, 50c may comprise Local Area Networks (LANs) implemented by one or more switches, hubs, bridges, wireless access points, and/or other network devices. In one embodiment, networks 50a, 50b, 50c are Ethernet (IEEE 802.3) networks; however, other link layer protocols can be employed.

Servers 20 host one or more network applications, such as a web site or an enterprise business application, accessible to one or more clients 60. Servers 20 may include HTTP server, file server, media server, streaming media server and/or other functional modules to deliver network applications over the computer network environment. Servers 20 may establish HyperText Transport Protocol (HTTP) connections directly with clients 60 and/or with proxies 30 that proxy transactions between servers 20 and clients 60. Clients 60 are computing systems, such as desktop computers, laptop computers and mobile devices, that host client applications that access servers 20 and other hosts operably connected to the computer network environment.

A proxy 30 is an intermediate system that is situated between a client 60 and a server 20 of a transaction. Various types of proxies exist. In Web access, a proxy can act as a web cache to reduce information access latency and bandwidth consumption. A proxy located in front of a group of origin servers, such as a reverse proxy or surrogate, offers load balancing capability and hides the identities of those servers. In addition to caching and load balancing, proxies can provide many other types of services including user authentication, connection acceleration, redirection, request and response filtering, access logging, translation and transcoding, virus scanning and spyware removal. For example, a proxy 30 can accelerate SSL connections by offloading computation intensive cryptographic operations to built-in crypto hardware; a proxy can translate web page content from one language into another before presenting the information to the user; a proxy can perform compression and decompression over slow or cost sensitive links. Proxies can also act as provisioned service access points to traverse firewalls. An intelligent information security proxy is a complex network appliance that is comprised of both hardware and software, which facilitates the construction of intelligent and fine-grained policy rules, and is the enforcer of those policies.

Proxies 30, in a particular implementation, are network proxies, such as forward proxy caches or gateway (reverse proxy) caches, that operate explicitly or transparently to clients 60. Proxies 30 are operative to terminate connections on the application and/or transport layer with clients 60, and establish application and/or transport layer connections with servers 20. Proxies 30 can apply one or more policies—such as security policies, caching policies and the like—when intermediating connections between servers 20 and clients 60. In a particular embodiment, proxies 30 implement a redirection protocol to negotiate and establish one or more service groups with router 40. Definition of the Service Groups allows proxies 30 to act as proxy caches for one or more servers 20, as discussed below. Alternative embodiments are also possible. For example, as FIG. 1B illustrates, the proxies may be transparent proxies, such as proxy 30a, disposed between network 50b and router 40 to obviate the need for redirection mechanisms.

Routers 40, 42, 44 are network devices that route packets according to information at Layer 3 (or Network Layer) of the Open Systems Interconnection (OSI) Reference Model. Routers 40, 42 44 can be IPv4-capable, IPv6 capable or implement dual stacks capable of supporting both IPv6 and IPv4 routing functions. In the implementation shown in FIG. 1A, router 40 can be configured to redirect network traffic to one of the proxies 30 to allow the proxies to intermediate transactions between clients 60 and servers 20. In a particular embodiment, router 40 can implement a cache communication protocol, such as the Web Cache Communications Protocol (WCCP) specified by Internet Draft "Web Cache Communication Protocol V2.0," {http://tools.ietf.org/id/draft-wilson-wrec-wccp-v2-01.txt}, which is incorporated by reference herein. In a particular implementation, router 40 is operative to negotiate and configure one or more WCCP Service Groups with one or more proxies 30. Each Service Group identifies the attributes defining the packets (e.g., IP addresses, TCP port numbers, etc.) that router 40 should redirect to one of the proxies 30 in the Service Group. Of course, other redirection mechanisms and protocols can be used.

Figure 3:
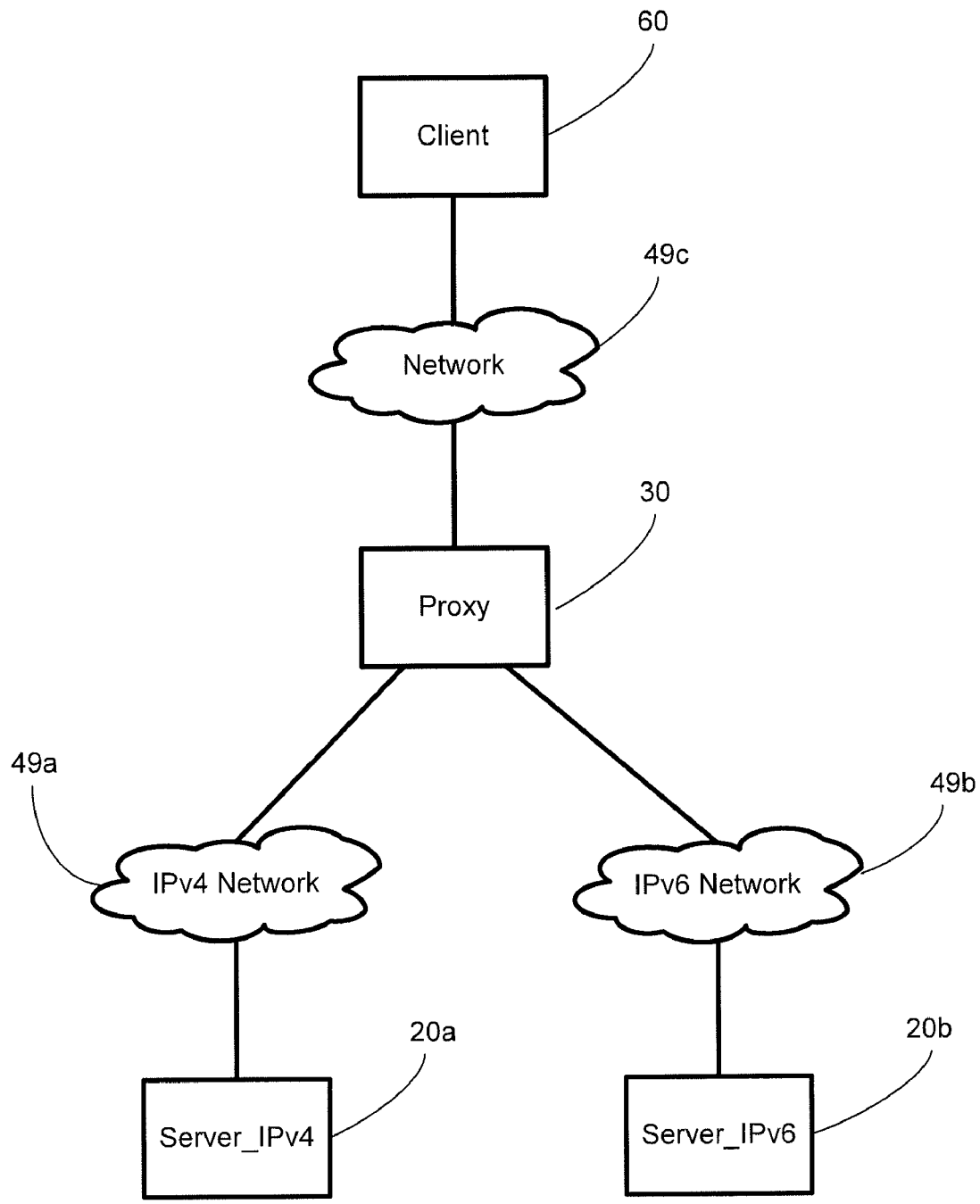
FIG. 3 is a schematic diagram of a computer network environment, in which a proxy can enable access to both IPv4 and IPv6 resources.

As FIG. 1A illustrates, proxies 30 and router 40 are in the same broadcast or Layer 2 domain. In other embodiments, proxies 30 and router 40 may be in different broadcast or Layer 2 domains. Still further, as discussed below, embodiments of the invention can operate in a wide variety of network configurations and topologies. For example, proxies 30 may be physically connected to one or more access links or other strategic locations in a network to obviate the need for redirection mechanisms. FIG. 3 illustrates an example network configuration, according to one particular implementation of the invention, that facilitates access between IPv4 and IPv6 hosts. As FIG. 3 illustrates, proxy 30 is physically or functionally (by some redirection mechanism) disposed between client 60 and servers 20a, 20b. In the implementation shown, server 20a supports only the IPv4 protocol and is connected to an IPv4 network 49a. Server 20b supports only the IPv6 protocol and is connected to an IPv6 network. Depending on the embodiment, client 60 and network 49c may support only the IPv4 or only the IPv6 network protocol. As discussed in more detail below, proxy 30 can be utilized to enable an IPv4-only client or an IPv6-only client to access either IPv4 or IPv6 resources.

B. Example Operation

Figure 5:
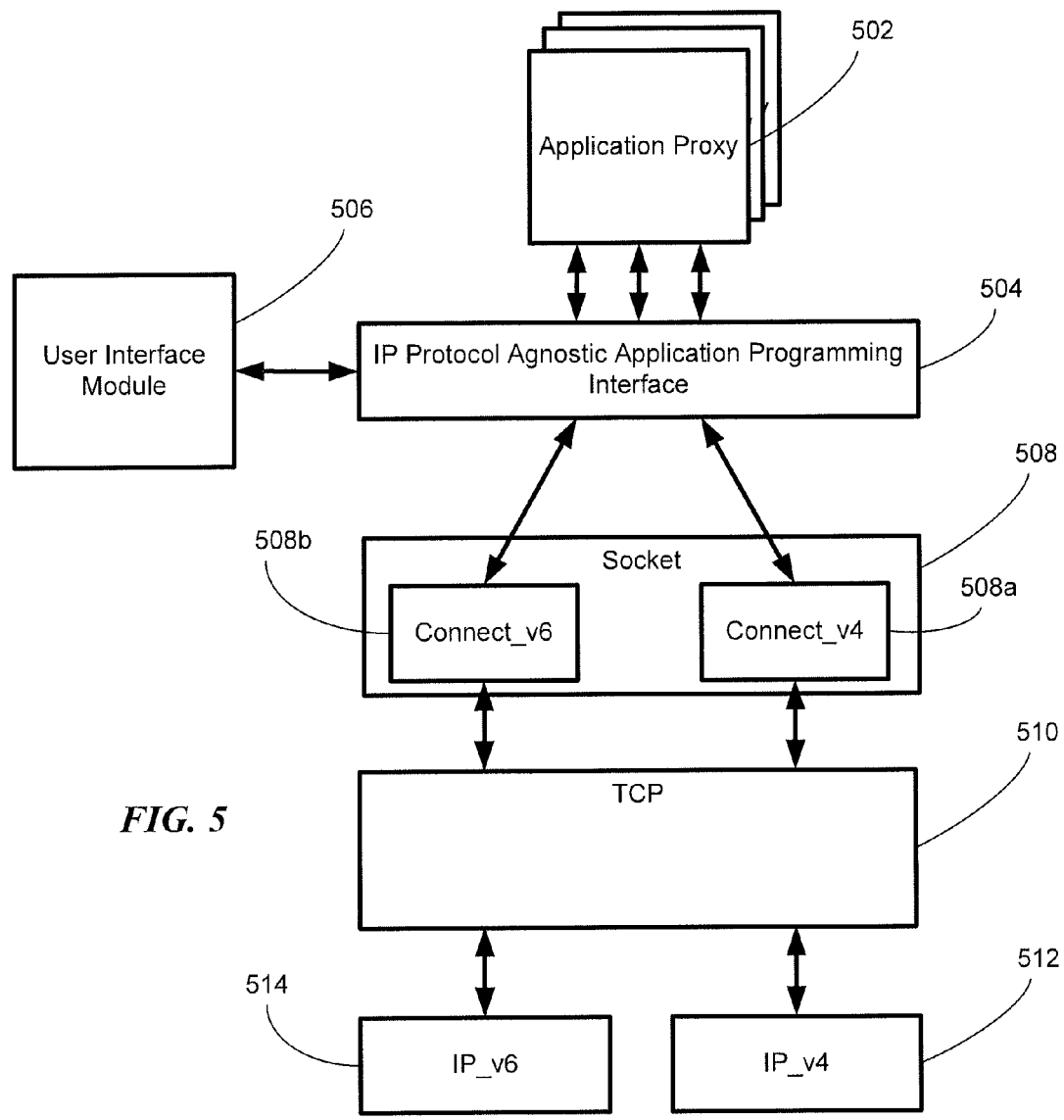
FIG. 5 is a block diagram illustrating functional modules of a proxy according to one possible embodiment of the invention.

Proxy applications—such as web caches and network security or firewall devices—typically operate at Layer 7 of the OSI Reference Model; however, as part of such functionality, these proxies may also implement lower layer protocols, such as the TCP/IP protocol suite. FIG. 5 sets forth an example functional architecture for proxy 30 according to one possible implementation of the invention. Proxy 30 hosts one or more application proxies 502. Application proxy 502 is a module that proxies application-level transactions between clients 60 and servers 20. In a particular implementation, application proxy 502 emulates an application server to clients 60 and emulates a client to application servers 20. Application proxy 502 can be configured to proxy a variety of different applications, such as Domain Name System (DNS) applications, Secure Sockets Layer (SSL) applications, HyperText Transport Protocol (HTTP) applications, File Transfer Protocol (FTP) applications, Multimedia Messaging Service (MMS) applications, Instant Messaging (IM) applications, and the like. User interface module 506 includes functionality that supports interface configuration and workflows according to which a network administrator may configure proxy.

IP-protocol-agnostic Application Programming Interface (IPAPI) 504 is an application programming interface layer that, relative to application proxy(ies) 502, presents hosts or endpoints as address or host objects, but abstracts away from the application proxy 502 the details of the network layer protocol associated with the host—i.e., whether the host is an IPv6-only host, an IPv4-only host, or a dual stack host. In other words, hosts are represented as address or host objects that include address information as generic host identification to the application proxy. The address or host object could be identified by reference to the actual network layer address; however, to the application proxy(ies) 502, the network layer address is merely a value string that maps to the host or address object. In other implementations, an arbitrary pointer value can be used to identify host or address objects which the application proxy(ies) 502 use to identify and distinguish between hosts. Lower layers of the communications protocol and processing stack, such as IPAPI 504, parse the address object to identify the actual network layer protocol in order to appropriately route the packets for processing.

For example, IPAPI 504 may support a connect_to_endpoint (address_object) API, which when called by an application proxy 502, causes IPAPI 504 to parse the network layer address of the address object to determine whether it is an IPv4 or IPv6 address and forward the request to appropriate processing modules of the communications protocol stack. Similarly, the network layer address fields contained in user interfaces presented by user interface module 506 are agnostic to the network layer protocol associated with a given network layer address. That is, when presented with a network address field in connection with a configuration interface, a network administrator may input either a 4-octet (32-bit) IPv4 address or an IPv6 address having 8 groups of four hexadecimal digits into the field. A parser module of the IPAPI 504 parses the address for identification of protocol version and appropriate processing. A network administrator, accessing the user interface module 506, may configure one or more policies to address various integration issues resulting from IPv4 to IPv6 network layer protocol transitions, whether such policy actions involves to IPv4-to-IPv6 conversion or vice versa.

Socket layer 508 provides a software endpoint for two-way communications between two application programs across a network. A given socket instance is typically bound to a port number so that a transport layer, such as Transmission Control Protocol (TCP) layer 510, can identify the application, to which that data is destined to be sent. To support various proxy operations, an application proxy 502, such as a DNS proxy, has a socket that is bound to a specific port number. The application proxy 502 listens to the socket for requests transmitted by clients. In addition, socket layer 508 also supports client-side functions, which application proxy(ies) 502 utilize to initiate connections with application servers on behalf of clients. As FIG. 5 shows, socket layer 508 includes an IPv4 socket module 508a, which supports connections with IPv4 resources, and an IPv6 socket module 508b, which supports connections with IPv6 resources. Transmission Control Protocol (TCP) layer 510 implements transport layer functions, such as connection establishment, end-to-end flow control, and reliable delivery. Proxy 30 may include additional transport layers, such as the User Datagram Protocol (UDP), as needed to support various network applications. Lastly, IPv4 layer 512 is a software module that implements IPv4 network layer protocol functions, while IPv6 layer 514 is a software module that implements IPv6 network layer protocol functions. Not illustrated, for purposes of clarity, are additional lower layers, such as link and physical layers of proxy 30.

B.1. IPv4-IPv6 Mapping under DNS Policy Control

There are two ways that a proxy can terminate connection, explicitly or transparently. In explicit proxy deployments, all client requests to an IPv6 host are sent directly to the proxy without resolving the domain name on the client. The benefit of an explicit proxy is that the Ipv4 client does not have to be concerned about whether an IPv6 domain name can be resolved and it is up to the proxy to handle the domain name resolution. For example, a user enters http://ipv6.example.com in a browser of an Ipv4 client, and if the browser is configured to access an explicit proxy, no DNS lookup for the Ipv4 "A" record is performed for ipv6.example.com. Note ipv6.google.com does not have an IPv4 address so the name lookup of "A" record for ipv6.google.com will fail. The client establishes a connection to the proxy and then it is the proxy that will perform a DNS lookup for "AAAA" record for ipv6.google.com. The DNS server returns the associated IPv6 address to the proxy. The proxy initiates an IPv6 connection to the server corresponding to ipv6.example.com. The connection between the client and the proxy is an IPv4 connection, while the connection from the proxy to the server is an IPv6 connection. The client is unaware of the fact the contents are actually retrieved from an IPv6 host. This is the easiest setup to deployment an IPv4-to-IPv6 proxy.

In transparent proxy deployments, the operating paradigm is different and the name resolution process depends on whether the domain name of the URL maps to IPv4 as well as IPv6 addresses or whether only an IPv6 address is available. For example, the domain www.kame.net is present on both IPv4 and IPv6 networks. Therefore, when the URL www.kame.net is entered into a browser, an Ipv4 client will perform a DNS lookup for an "A" record of www.kame.net and the IPv4 address for www.kame.net is returned. The HTTP request initiated by the client will be transparently intercepted by the proxy and it has full control on whether the upstream connection should be made over IPv4 or IPv6 network.

In the case that the IPv6 host is only present on an IPv6 network, such as ipv6.example.com, getting the proxy to transparently intercept the client request can be problematic, because the DNS lookup for an "A" record for ipv6.example.com will fail on the Ipv4 client and thus no connection request will be initiated by the client. In order to work around this issue, the proxy can manipulate the DNS lookup on the client network by hosting a DNS proxy. The purpose of the DNS proxy is to return a valid IPv4 address back to the client when the client performs the DNS lookup for an "A" record for ipv6.example.com. Although the "A" record for ipv6.example.com does not exist, the proxy can be programmed to return an "A" record back to the client when the proxy recognizes that ipv6.example.com only has an "AAAA" record associated with it. The fabricated IPv4 address in the "A" record should be chosen properly such that the address is both routable and places the proxy in the path when the client connects to this fabricated IPv4 address for ipv6.example.com.

Multiple options can be utilized to fabricate the IPv4 address returned to the client. One option is to use the proxy's IPv4 address. In this case, the client establishes a connection to the proxy, and from that perspective the proxy will process the request similar to the case of an explicit proxy as mentioned previously. Using the proxy's IPv4 address works with many network protocols, such as HTTP, because the HTTP protocol supports the concept of proxy. The proxy accesses the host header field in the HTTP request to determine the domain name of the server, thus the mapping between the fabricated address and the domain name. A second option is to assign different IPv4 addresses to different domain names and create a mapping table in the proxy to keep track of the mapping relationship.

When initially accessing a server 20, a client 60 typically accesses a DNS server to resolve a host name (e.g., www.hostname.com) to an IP address to allow for packet routing across a network. IPv6 addresses are represented in the Domain Name System by so-called AAAA resource records, while IPv4 addresses are represented by so-called A records. A host name may resolve to two or more records across different record types. After a client receives a DNS record, it may cache it and re-use this information, as opposed to transmitting a new request, until the record expires as defined in the Time-To-Live (TTL) field of the DNS record.

Figure 6:
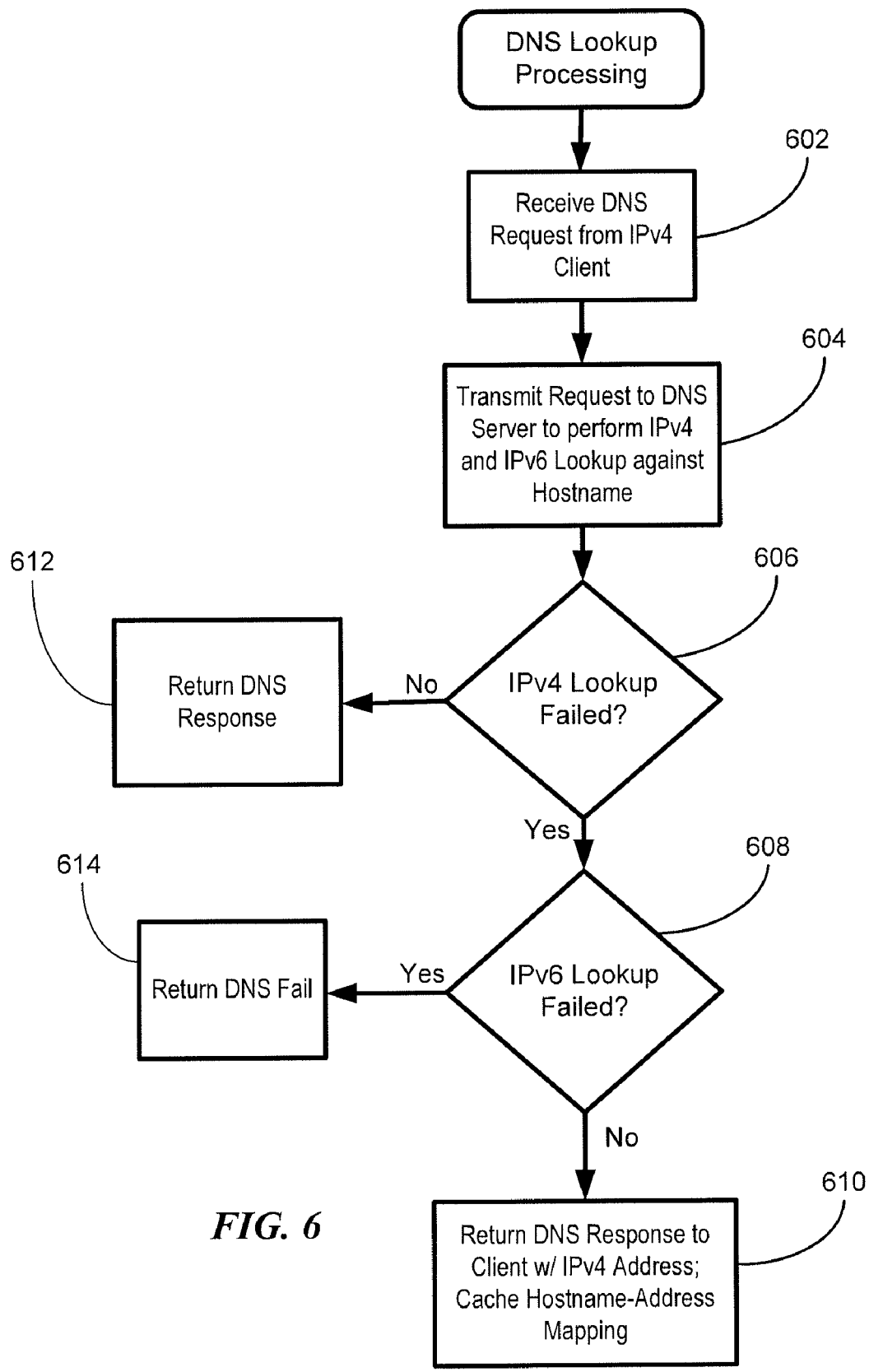
FIG. 6 is a flow chart showing an example method directed to proxying Domain Name System (DNS) lookups and applying polices to facilitate access between hosts applying different network layer protocols.

One of the application proxies 502 hosted on proxy 30 is a DNS proxy that proxies DNS transactions between a client 60 and a DNS server. As discussed below, the DNS proxy may be configured to apply various policies that facilitate transition between, and integration of, IPv4 and IPv6 networks. Still further, the proxy 30, in the implementation discussed below, operates as a transparent proxy. FIG. 6 illustrates an example method according to one possible implementation of the invention. The process illustrated in FIG. 6 can be applied to allow a client 60 that supports only the IPv4 network layer protocol to access IPv4 and IPv6 resources. When proxy 30 receives a DNS request from an IPv4-only client (602), it may transmit a DNS request to one or more DNS servers to perform a lookup of IPv4 and IPv6 addresses that map to the host name identified in the DNS request (604). In the implementation shown, if the IPv4 lookup does not fail (606), the proxy 30 returns the DNS response to the client (612). If the IPv4 lookup (606) and the IPv6 lookup (608) both fail, the proxy returns a failure response to the client (614). Otherwise, if the IPv6 lookup succeeds, the proxy 30 returns to the client 60 a DNS response with an IPv4 address of the proxy 30 (such as the proxy's own unique IP address or an address from a pool of reserved addresses) and caches the hostname-to-address mapping in a table or other data structure for later reference (610). In other implementations, the proxy 30 does not cache the hostname-to-Ipv6 address mapping, if the unique IP address of the proxy 30 itself is used. Rather, when the client initiates a connection to the proxy and transmits an HTTP request, the proxy 30 accesses the hostname in the HTTP request transmitted by the client and performs an IPv6 DNS look up at that time when establishing a connection to the Ipv6 server. Other implementations are also possible. For example, when using a pool of Ipv4 addresses, proxy 30 may map the selected Ipv4 address from the pool directly to the Ipv6 address returned in the DNS response or to the hostname. In the latter embodiment, when an HTTP request is received, the proxy accesses the mapping information against the destination Ipv4 address to identify the host name and performs an Ipv6 DNS lookup to identify the Ipv6 address.

Proxy 30, in some implementations, will maintain this mapping information for an amount of time that corresponds to the TTL value returned in the DNS response. After this TTL period, a client application will typically transmit a new DNS request, which will cause the proxy to refresh its host name-address mapping information as discussed above. Some client applications, however, cache the DNS response information for as long as the client application remains open. Accordingly, some implementations of the proxy maintains the host-name address mapping information for a longer period of time.

With reference to FIG. 3, client 60, after it obtains an IP address, may then transmit an HTTP request using the IPv4 network address returned during the DNS lookup. If the actual IPv4 address of a server, such as server 20a, was provided to the client, proxy 30 can intercept the HTTP request and use the IP address of server 20a identified in the request when initiating a connection to that server. However, if the IPv4 address of the proxy is returned to the client 60, the proxy 30 has to map information obtained from the HTTP request, or other data packets, transmitted by the client 60 to the IPv6 address of the destination server 20b. This mapping can be accomplished in several manners depending on various implementation details.

In one implementation, the IPv4 address of the proxy 30 that is returned to a client is non-unique relative to the IPv6 hosts corresponding to transactions, which the proxy may be intermediating at a given time. For example, the proxy 30 may return the same IPv4 address to a client 60 when mapping from an IPv6 address to an IPv4 address. In such an implementation, the proxy 30 accesses the host name identified in HTTP host headers including in the HTTP request transmitted by the client 60 and maps the host name in the HTTP request to the IPv6 address stored in its cache. After identifying the IPv6 address of the server 20b, the proxy 30 opens an HTTP connection with the server. In one implementation, the proxy 30 uses as the source address an IPv6 address of the proxy similar to a router using Network Address Translation (NAT).

Other implementations are possible. For example, proxy 30 may maintain a pool of IPv4 addresses that it can use to establish unique mappings between IPv4 addresses transmitted to clients in DNS responses and the IPv6 addresses returned in response to host name lookups with a DNS server. In this manner, relying on host names in HTTP host headers can be obviated. In other implementations, proxy 30 can apply a combination of the two techniques based on information available in HTTP messages, such as user agent identifiers, that indicate whether the client application supports the use of host headers, such as browser clients complying with HTTP version 1.1 and higher. In addition, subsequent HTTP requests to the same host within the TTL period, will involve the proxy 30 accessing its cache to map to an IPv6 address based on either the host name or a unique IPv4 address in the HTTP request.

The policy configuration illustrated in FIG. 6 represents one of many possible embodiments of the invention. For example, in the embodiment of FIG. 6, proxy returns an actual IPv4 address of a server if it is available. In another possible policy configuration, the proxy 30, when a host name resolves to an IPv4 address and an IPv6 address, can return the actual IPv4 address of the server (or an IPv4 address of the proxy 30), and during intermediation of a transaction, map the IPv4 destination address identified in an HTTP request, for example, to the IPv6 address identified during the DNS lookup. In this manner, proxy 30 can be configured to favor utilization of IPv6 resources when possible. To support such an implementation, proxy 30 can maintain a mapping table where each entry comprises an IPv4 address, an IPv6 address and a host name. Furthermore, a similar connection-mapping mechanism can be employed to achieve a form of load balancing, if an IPv4 and corresponding IPv6 resource are both available. Still further, policies can be configured to allow connections only to Ipv4 or Ipv6 resources for selected domain names, or to specify Ipv4 or Ipv6 preferences for selected domain names.

Still further, proxy 30 can also be utilized in connection with IPv6-only and dual-stack clients 60 as well. For example, proxy 30 can be configured to allow IPv6-only clients to access IPv4-only resources. In another example embodiment, proxy 30 can be configured to favor utilization of IPv6 resources over IPv4 resources, when possible.

B.2. Proxy-to-Proxy based Tunnel to Traverse Incompatible Network Cloud

Figure 4:
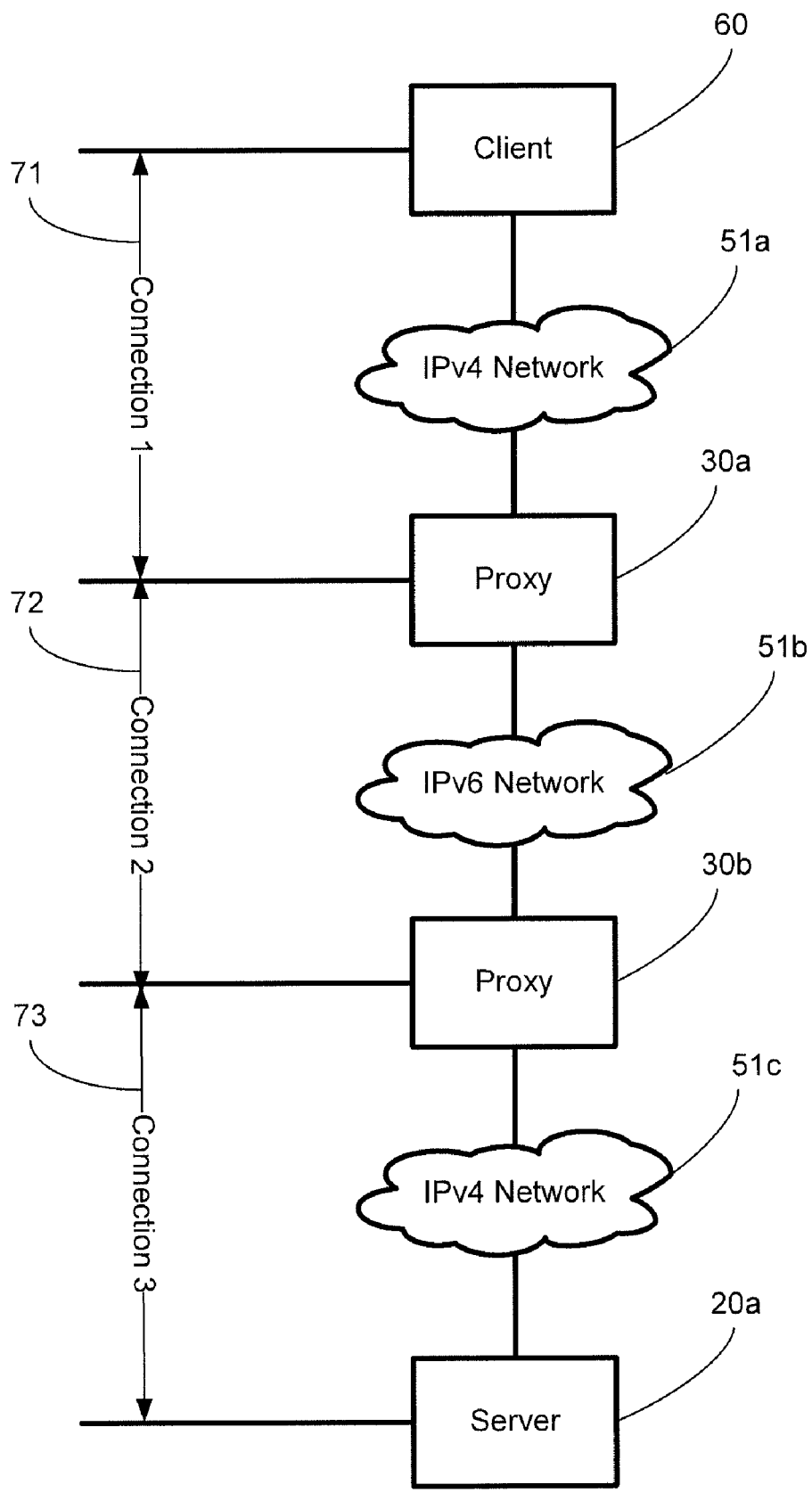
FIG. 4 is a schematic diagram of an example proxy-to-proxy based tunneling architecture.

With reference to FIG. 4, proxies 30a, 30b can also be configured to facilitate a transaction between IPv4-only hosts to traverse an IPv6 network. As FIG. 4 illustrates, proxies 30a, 30b operate to intermediate a transaction between server 20a and client 60, both of which support only the IPv4 network layer protocol.

As FIG. 4 illustrates, a client-server transaction, such as an HTTP transaction, involves three application/transport layer connections due to interception and processing of client and server messages by the proxies 30a, 30b at the application layer. Unlike the Layer 3 tunneling mechanisms disclosed in RFC 4213, however, the IPv4 packets embodying the messages are not encapsulated in IPv6 headers and forwarded across IPv6 network 51b. Rather, when a first proxy 30a receives a request from a client 60, such as an HTTP request, over a transport layer connection 71 on the IPv4 network 51a, it establishes a new transport layer connection 72 with second proxy 30b on IPv6 network 51b, and forwards the data of the HTTP request to the second proxy 30b. The first proxy 30a also maintains a mapping between connection 71 and connection 72. Processing the request at the application layer by proxy 30a, however, causes the IPv4 header of the request, including the IPv4 address of the server 20a, transmitted by the client to be stripped away.

Figure 7:
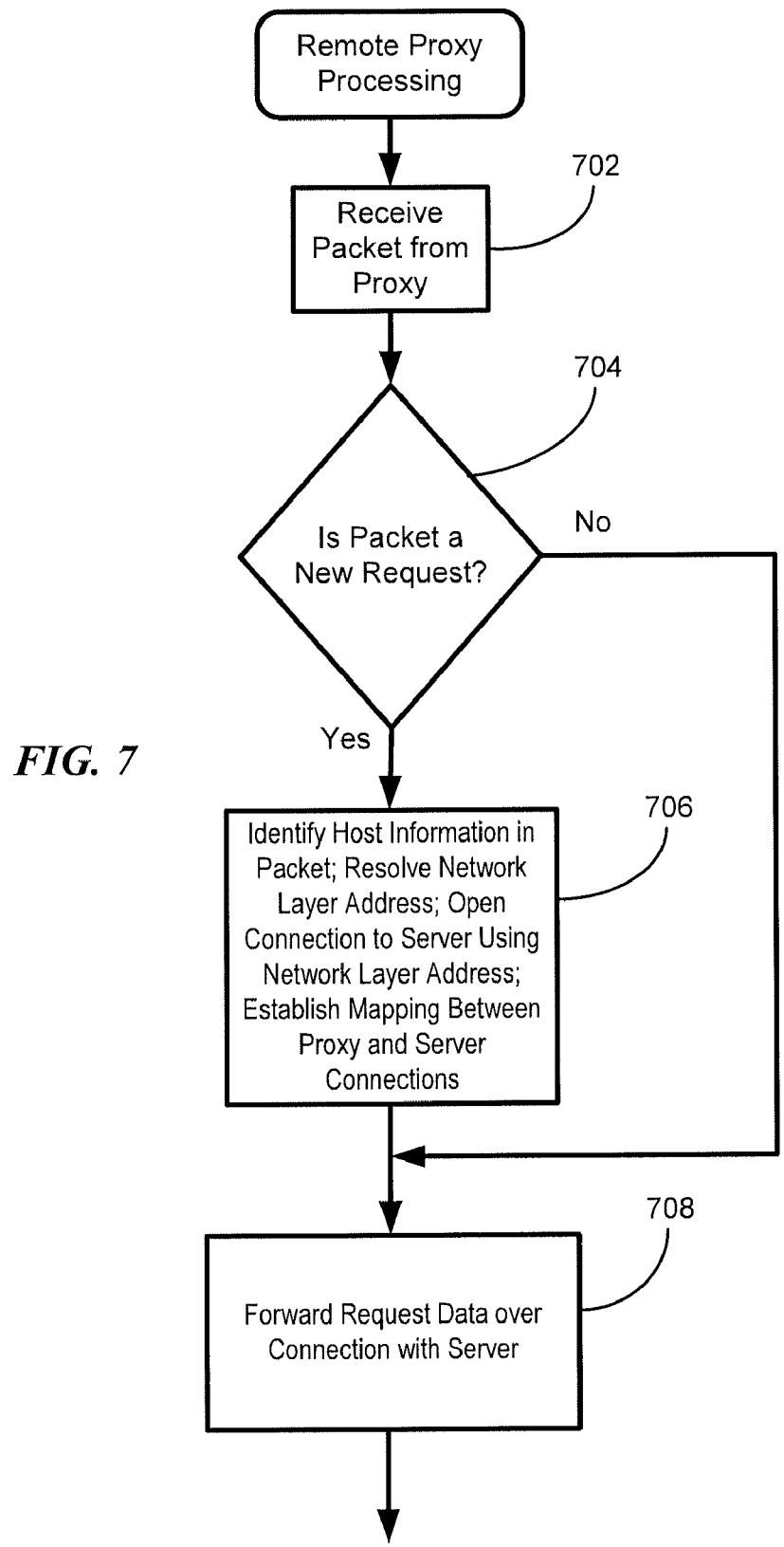
FIG. 7 is a flow chart illustrating an example method that can be implemented in connection with a proxy-to-proxy based tunneling architecture.

FIG. 7 illustrates a process flow implemented by the second proxy 30b. As FIG. 7 shows, when second proxy 30b receives a packet from first proxy 30b (702), it determines whether the packet corresponds to a new request, such as a new HTTP request (704). If so, the second proxy 30b accesses host information embodied in the request to resolve the network layer address of the server 20b and opens a new transport layer connection 73 on IPv4 network 51c with the server 20a using the network layer address (706). The second proxy 30b also maintains a mapping between connection 72 and connection 73. The second proxy 30b then forwards the request over the new connection to server 20a (708). As discussed above, many requests, such as HTTP requests, include host names and other information that can be used to resolve an IP address. In one embodiment, second proxy 30b, for HTTP requests, accesses the host name information in the host header and performs an IPv4 DNS lookup to resolve the IPv4 address of the server 20a. Other implementations are possible. For example, first proxy 30a may append a header to the first packet of a new request that identifies the IP address (and possibly port number) associated with the server 20a. In addition, the proxy-to-proxy based tunnel architecture can be applied to allow IPv6 hosts to interact over IPv4 networks.

In addition, given the 1:1:1 relationship between connections 71, 72, 73, forwarding of additional packets of a transaction between client 60 and server 20a, such as response packets, is straightforward, as second proxy 30b can write packet data received on the socket corresponding to connection 73 to the socket corresponding connection 72. Similarly, first proxy 30a can write packet data received on the socket corresponding to connection 72 to the socket corresponding connection 71.

The proxy-to-proxy based tunnel architecture set forth above achieves a variety of advantages over the Layer 3 tunneling mechanisms described in RFC 4213. For example, the proxy-to-proxy tunnel architecture is more efficient as it eliminates one encapsulating header from packets forwarded across the network 51b. In addition, terminating connections at the application layer allows for application of larger set of more complex user and application oriented policies, and allows for many existing IPv4 applications to operate across new IPv6 network infrastructure, or new IPv6 applications to operate across existing IPv4 network infrastructure, without any knowledge of that infrastructure. Furthermore, terminating connections at the proxies 30a, 30b increases security by eliminating access to the network layer address information of client 60 and server 20a from routing or forwarding nodes of network 51b.

C. Example Computing System Architectures

While the foregoing processes and mechanisms can be implemented by a wide variety of physical systems and in a wide variety of network environments, the proxy systems described below provide example computing system architectures for didactic, rather than limiting, purposes.

Figure 2:
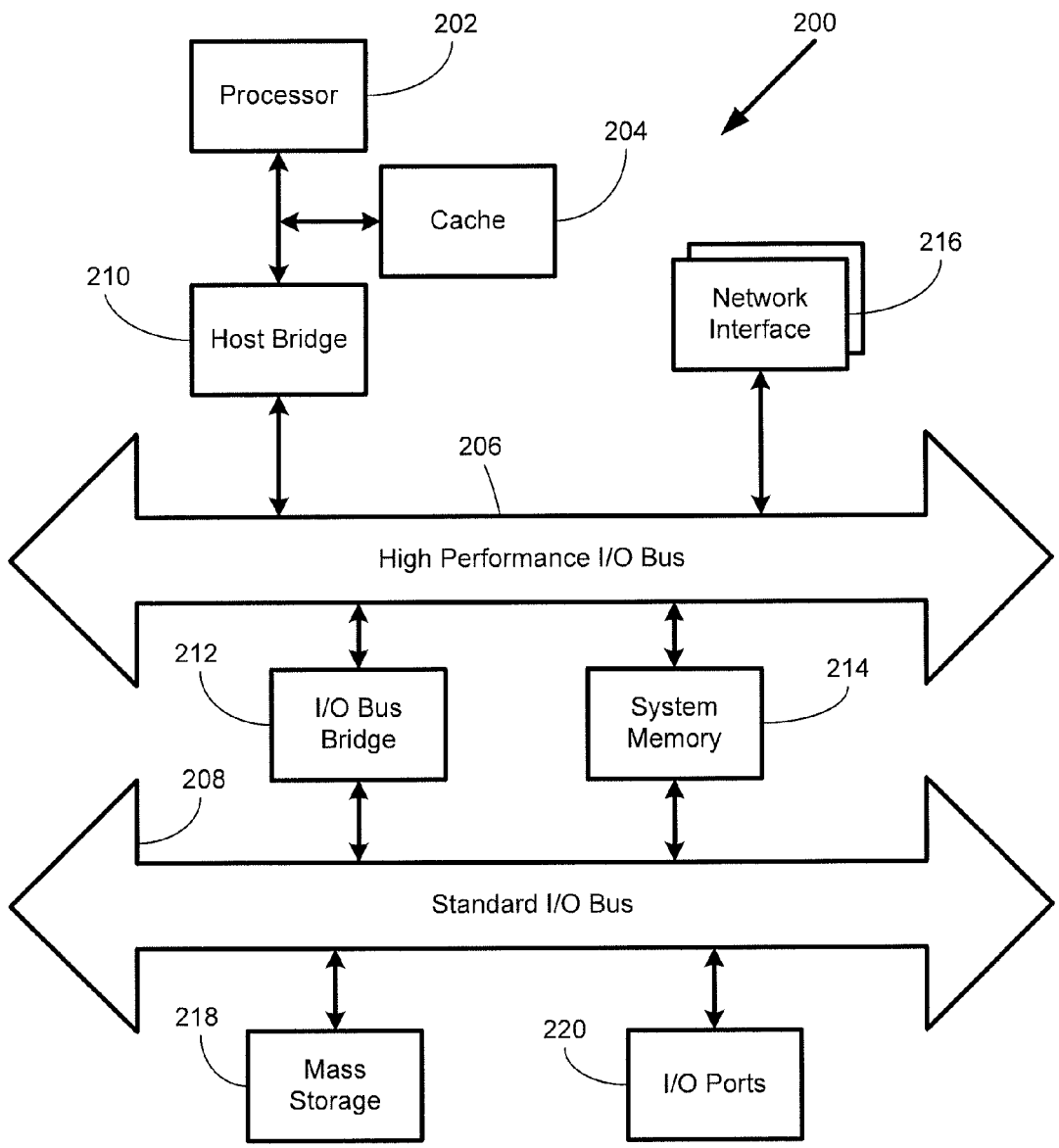
FIG. 2 is a functional block diagram illustrating an example network device hardware system architecture.

FIG. 2 illustrates an example computing system architecture, which may be used to implement a physical proxy server. In one embodiment, hardware system 200 comprises a processor 202, a cache memory 204, and one or more executable modules and drivers, stored on a computer readable medium, directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and one or more network/communication interfaces 216 couple to bus 206. Hardware system 200 may further include video memory (not shown) and a display device coupled to the video memory. Mass storage 218, and I/O ports 220 couple to bus 208. Hardware system 200 may optionally include a keyboard and pointing device, and a display device (not shown) coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above-described functions implemented in the cache or proxy 30, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments, only a single bus may exist, with the components of hardware system 200 being coupled to the single bus. Furthermore, hardware system 200 may include additional components, such as additional processors, storage devices, or memories.

As discussed below, in one implementation, the operations of one or more of the proxy servers described herein are implemented as a series of executable modules run by hardware system 200. In a particular embodiment, a set of software modules or drivers implements a network communications protocol stack, including a link layer driver, a network layer driver, one or more transport layer modules (e.g., TCP, UDP, etc.), session layer modules, application layer modules and the like. The hardware system 200 may also host one or more application proxy modules, such as DNS and HTTP proxy modules. The foregoing functional modules may be realized by hardware, executable modules stored on a computer readable medium, or a combination of both. For example, the functional modules may comprise a plurality or series of instructions to be executed by a processor in a hardware system, such as processor 202. Initially, the series of instructions may be stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. Any suitable operating system may be used, such as the Windows Operating System offered by Microsoft Corporation, the Apple Macintosh Operating System, available from Apple Computer Inc. of Cupertino, Calif., UNIX operating systems, LINUX operating systems, BSD operating systems, and the like. Of course, other implementations are possible. For example, the proxy and caching functionalities described herein may be implemented in firmware or on an application specific integrated circuit.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

The present invention has been explained with reference to specific embodiments. For example, while embodiments of the present invention have been described as operating in connection with HTTP and TCP, the present invention can be used in connection with any suitable protocol environment. Furthermore, implementations of the invention can be used in systems directed to other types of proxies, such as protocol or network traffic accelerators, firewalls and packet inspection devices. Other embodiments will be evident to those of ordinary skill in the art. It is therefore not intended that the present invention be limited, except as indicated by the appended claims.

What is claimed is:

1. A method comprising:
  receiving, at a proxy, a request from a client, wherein the request includes a host name, and wherein the request is embodied in a packet having a first network layer address, associated with the client, corresponding to a first network layer protocol;
  accessing one or more data stores of mappings between host names and network layer addresses to identify one or more network layer addresses associated with the host name identified in the request, wherein one or more of the network layer addresses in the one or more data stores correspond to the first network layer protocol and other ones of the network layer addresses correspond to a second network layer protocol; and
  generating a response to the request, wherein the response includes a second network layer address corresponding to the first network layer protocol, wherein the second network layer address is selected from the one or more identified network layer addresses mapped to the host name or a third network layer address based on application of one or more policies; and forwarding the response to the client,
  wherein application of the one or more policies comprises determining whether one or more of the identified network layer addresses corresponds to the second network layer protocol and selecting the third network layer address if at least one of the one or more identified network layer addresses corresponds to the second network layer protocol; and
  wherein the method further comprises caching, in a mapping data structure, one of the one or more identified network layer addresses in association with the host name identified in the request, if the third network layer address is selected based on the application of the one or more policies.

2. The method of claim 1 wherein the third network layer address is a network layer address of the proxy.

3. The method of claim 1 wherein the third network layer address is a network layer address selected from a pool of network layer addresses.

4. The method of claim 1 wherein at least one of the one or more data stores is a Domain Name System (DNS) server.

5. The method of claim 3 further comprising
  if the third network layer address is selected, caching, in a mapping data structure, the selected network layer address in association with the host name identified in the request.

6. The method of claim 1 further comprising
  proxying a transaction between the client and a remote host associated with the host name; wherein proxying the transaction comprises
    establishing a first connection with the client according to the first network layer protocol;
    establishing a second connection with the remote host; and
    forwarding data received from the client on the first connection to the remote host over the second connection.

7. The method of claim 6 wherein the second connection with the remote host employs the second network layer protocol.

8. The method of claim 1 wherein the first network layer protocol is version 4 of the Internet Protocol and the second network layer protocol is version 6 of the Internet Protocol.

9. The method of claim 1 wherein the first network layer protocol is version 6 of the Internet Protocol and the second network layer protocol is version 4 of the Internet Protocol.

10. The method of claim 1 wherein the one or more policies are operative to bias selection of the second network layer address based on a preference for the first network layer protocol or the second network layer protocol.

11. The method of claim 1 wherein one of the one or more identified network layer addresses is selected for the second network layer address if the identified network layer address corresponds to the first network layer protocol.

12. The method of claim 1 wherein the third network layer address is selected for the second network layer address if at least one of the one or more identified network layer addresses corresponds to the second network layer protocol.

13. A method comprising:
  receiving, at a proxy, an address lookup request from a client, wherein the address lookup request includes a host name associated with a remote host, and wherein the address lookup request is embodied in a packet having a first network layer address, associated with the client, corresponding to a first network layer protocol;
  accessing one or more data stores of mappings between host names and network layer addresses to identify one or more network layer addresses associated with the host name identified in the address lookup request, wherein one or more of the network layer addresses in the one or more data stores correspond to the first network layer protocol and other ones of the network layer addresses correspond to a second network layer protocol; and
  wherein, if all of the one or more identified network layer addresses correspond to the second network layer protocol, then: selecting, from a pool of network layer addresses, a second network layer address corresponding to the first network layer protocol, and caching, in a mapping data structure, the second network layer address in association with the host name identified in the address lookup request; and generating a response to the address lookup request that includes the second network layer address corresponding to the first network layer protocol; and transmitting the response to the client.

14. The method of claim 13 further comprising proxying a transaction between the client and the remote host associated with the host name; wherein proxying the transaction comprises establishing a first connection with the client according to the first network layer protocol;

establishing a second connection with the remote host according to the second network layer protocol; and forwarding data received from the client on the first connection to the remote host over the second connection.

15. The method of claim 14 wherein establishing the second connection comprises accessing the mapping data structure against the second network layer address to identify the host name; and looking up a third network layer address corresponding to the second network layer protocol using the host name.

16. A method, comprising:

receiving, on a first connection over a first network, a packet from a remote proxy, wherein the first network corresponds to a first network layer protocol;

determining whether the packet corresponds to a new request;

if the packet corresponds to a new request, accessing host information embodied in the request and resolving a network layer address of a remote server, wherein the network layer address corresponds to a second network layer protocol;

establishing a second connection over a second network with the remote server using the network layer address; and forwarding the request on the second connection over the second network.

wherein resolving the network layer address of the remote server comprises performing a network address lookup in a data store that maintains mappings between host names and network layer addresses, wherein the network address is selected from one or more network layer addresses mapped to the host information or a third network layer address based on application of one or more policies by determining whether the one or more network layer addresses corresponds to the second network layer protocol and selecting the third network layer address if at least one of the one or more network layer addresses corresponds to the second network layer protocol.

17. The method of claim 16 further comprising maintaining a mapping between the first connection and the second connection; forwarding data received on the first connection to the remote server over the second connection; and forwarding data received on the second connection to the remote proxy over the first connection.

18. The method of claim 16 wherein the first network layer protocol is version 6 of the Internet Protocol and the second network layer protocol is version 4 of the Internet Protocol.

* * * * *